Aug. 16, 1955     F. J. HUMPOLA ET AL     2,715,394
AUTOMOBILE ENGINE COOLER
Filed Oct. 5, 1953
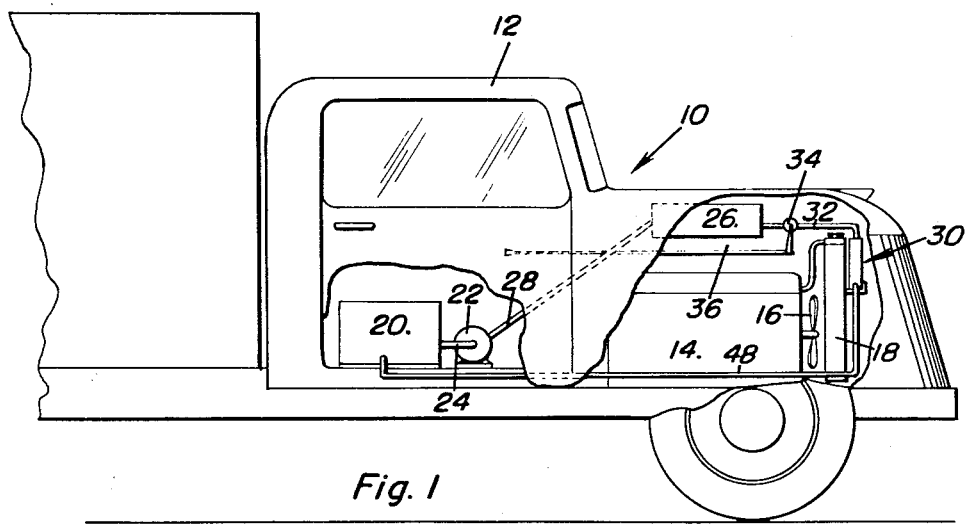
Fig. 1
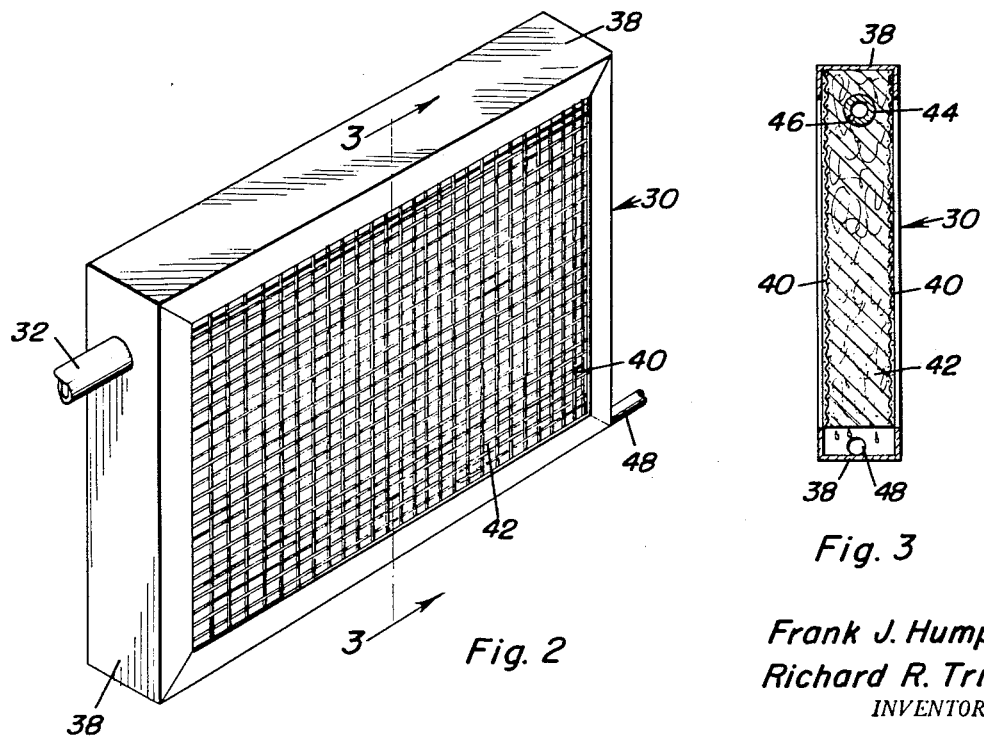
Fig. 2
Fig. 3
Frank J. Humpola
Richard R. Tripp
INVENTORS.
BY *Clarence A. O'Brien*
*and Harvey B. Jacobson*
Attorneys

United States Patent Office 2,715,394
Patented Aug. 16, 1955

2,715,394

AUTOMOBILE ENGINE COOLER

Frank J. Humpola, Houston, Tex., and Richard R. Tripp, Williamsburg, Va.

Application October 5, 1953, Serial No. 384,076

3 Claims. (Cl. 123—41)

This invention relates to an auxiliary engine cooler, and more particularly to a cooler adapted to be used in conjunction with the standard cooling system of a combustion engine, only when demanded by occasion of overheating the normal engine cooling system.

An object of this invention is to provide an auxiliary cooler for a combustion engine which does not alter or interfere with the standard cooling system in any manner, under normal operating conditions.

Another object of this invention is to provide an auxiliary cooler for an automobile engine which is mounted adjacent the hottest part of the engine radiator.

A further object of this invention is to provide an auxiliary cooler for automobile engines having its own cooling liquid supply system.

A still further object of this invention is to provide an auxiliary cooler for automobile engines which may be operated by a thermostatic switch.

A further object of this invention is to provide an auxiliary cooler for automobile engines which is operable at the will of the operator of the vehicle.

A still further object of this invention is to provide an auxiliary cooler for an automobile engine having a cooling member of porous material mounted adjacent the hottest part of an engine radiator.

A yet further object of this invention is to provide an auxiliary cooler for automobile engines which is simple and efficient in construction and inexpensive to manufacture and assemble.

These together with other objects and advantages which will become subsequently apparent reside in the details of construction and operation as more fully hereinafter described and claimed, reference being had to the accompanying drawings forming a part thereof, wherein like numerals refer to like parts throughout, and in which:

Figure 1 is a side view of a motor vehicle with parts of the motor vehicle broken away showing the preferred form of the present invention mounted on the engine thereof;

Figure 2 is a perspective view of the preferred form of the cooling member forming the subject of this invention; and Figure 3 is a sectional view of the preferred form of cooler taken substantially along the section line 3—3 of Figure 2.

Referring to Figure 1, a motor truck or other similar automotive vehicle including passenger automobiles is indicated generally at 10 and shows a cab section 12, an engine 14, a fan 16 and a radiator 18.

A cooling liquid storage tank 20 and a pump 22 are mounted in the cab section 12 underneath the seat. The tank 20 can be secured in any other suitable position. The pump 22 can likewise be positioned in any other suitable place and can be spaced away from the tank 20. A conduit 24 connects the cooling liquid storage tank 20 with the inlet side of the pump 22. The pump 22 is driven by a six or twelve volt electric motor which operates by a switch from inside the cab at the operator's finger tips.

In the embodiment shown, a supply tank 26 is mounted underneath the hood of the vehicle adjacent the top thereof and is connected by a conduit 28 to the discharge side of pump 22. An evaporator, generally designated 30, is mounted in front of the radiator 18 adjacent the top thereof and is connected to the supply tank 26 at the side opposite the connection of conduit 28 by a conduit 32. A control valve 34 is disposed in conduit 32 for controlling the flow of cooling liquid from the supply tank to the evaporator 30. A suitable control means 36 is connected to the valve 34 and extends to a point within the cab section 12 whereby the operator of the vehicle can control the flow of fluid through the conduit 32.

However, it is to be understood that the supply tank 26 can be omitted and the conduit 28 connected to the conduit 32 in which case the valve 34 and the control 36 would be omitted. Thus, the control of the pump 22 would also control the flow of cooling liquid to the conduit 32 and the evaporator 30.

When it is desired to use the auxiliary cooler, in the embodiment shown, the operator of the vehicle turns on the motor operating pump 22 thereby pumping cooling liquid from the storage tank 20 into the supply tank 26. The valve 34 is then moved to an open position allowing the cooling liquid to flow from the supply tank 26 by means of gravity to the evaporator 30. The valve 34 is adjusted to give a flow which will attain the desired cooling.

When the supply tank 26 is omitted the cooling liquid will flow from the pump under pressure to the evaporator 30. This construction will allow a greater diffusion of the cooling liquid entering the evaporator 30.

The evaporator 30 is formed of a plurality of channel members joined in end-to-end relationship and with the leg portions thereof facing inwardly. The channel members 38 thus form a rectangular structure having inwardly extending flanges at the front and rear edges thereof. A pair of walls 40 are mounted within the frame members of the evaporator 30 with one of the walls 40 lying adjacent the front inwardly extending flanges and the other wall 40 lying adjacent the rear inwardly extending flanges. The walls 40 terminate above the lower channel member forming the bottom of the rectangular structure. The walls 40 are of a mesh material such as screen, or of some other thin material having a plurality of openings therein. A layer of porous material 42 is disposed between the walls 40 within the frame of the evaporator 30 which material allows the passage of air therethrough. An extension 44 on the conduit 32 is disposed within the frame of the evaporator 30 parallel to the upper side of the frame. The extension 44 may be embedded in the porous material or can be disposed thereabove but beneath the upper channel member 38. In some instances the rectangular frame can be omitted and the evaporator can be constructed of a box-like structure of mesh material having porous material mounted therein. In such a case the conduit 44 would be disposed above the upper side of the evaporator.

The lower channel member 38 forms a reservoir for collecting the excess cooling liquid which passes through the evaporator 30. When the channel members are omitted it is necessary to supply a lower trough-like structure underneath the evaporator for collecting the excess cooling liquid.

Extension 44 is provided with a plurality of apertures 46, one of which is shown in Figure 3, which apertures allow the cooling liquid flowing from the supply tank through conduit 32 to flow from the extension 44 into the porous material 42. The cooling liquid flowing from the apertures 46 will seep down through the porous material where it will be evaporated by the air passing through the porous material 42. This evaporation will cause a cooling of the air which passes through the evaporator and which air in turn will cool the upper portion of the radiator 18.

A conduit 48 is connected to the lower channel member 38 of the rectangular frame and also to the cooling liquid supply tank 20. The excess cooling liquid will flow by gravity through the conduit 48 back to the supply tank 20. Thus, the excess cooling liquid is available for re-use.

If desired, a thermostatic switch can be mounted in the standard cooling system of the engine, which switch will actuate the motor for the pump 22 when the temperature of the cooling liquid of the engine reaches a desired point. In the embodiment shown the switch would also control the valve 34. When using a pressure system, by omitting the tank 26 and the valve 34, the thermostatic switch would only have to control the pump 22.

When using the embodiment shown, the cooling liquid flowing from the apertures 46 would merely drop therefrom and seep through the porous material 42. However, in using the pressure system the cooling liquid would be sprayed from the apertures 46 thereby allowing a greater diffusion of the cooling liquid within the porous material 42.

The evaporator 30 is to be of such a size as to afford a substantial cooling area for the hottest part of the radiator without interfering with the standard cooling system under normal operating conditions. The auxiliary cooler is to be used only when the standard cooling system exceeds a predetermined temperature. The air passing through the evaporator will be substantially cooled due to the evaporation of the cooling liquid which is passing therethrough. This cooling of the air will provide an increased cooling of the hottest part of the radiator and consequently an increased cooling of the water flowing therethrough.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. An automobile engine cooler comprising a pressure discharge cooling liquid storage tank, a gravity discharge supply tank, a first conduit connecting the storage tank and the supply tank, an evaporator adapted to be mounted in front of the hottest part of an automobile radiator, a second gravity feed conduit connecting the supply tank with the top of the evaporator, and a conduit connected to said evaporator and said storage tank for returning excess liquid to the storage tank.

2. An automobile engine cooler comprising a pressure discharge cooling liquid storage tank, a gravity discharge supply tank, a first conduit connecting the storage tank and the supply tank, an evaporator adapted to be mounted in front of the hottest part of an automobile radiator, a second gravity feed conduit connecting the supply tank with the top of the evaporator, said evaporator comprising an outer frame, a pair of perforated walls having a layer of porous material therebetween mounted in said frame, said perforated walls forming the front and rear walls of the evaporator and an extension on the second conduit embedded in the upper portion of the porous material, said extension having a plurality of apertures therein, and a conduit connected to said evaporator and said storage tank for returning excess liquid to said storage tank.

3. An automobile engine cooler comprising a pressure discharge cooling liquid storage tank, an evaporator adapted to be mounted in front of the hottest part of an automobile radiator, a conduit connecting said storage tank and said evaporator, pump means connected to said conduit for forcing and cooling liquid from said storage tank to said evaporator and control means for said pump, a second conduit secured between said storage tank and said evaporator for returning excess cooling liquid to said storage tank, said evaporator comprising a body of mesh material having a filling of porous material, said first conduit having an extension overlying said body, said extension having a plurality of apertures therein and a trough disposed beneath said body for collecting excess cooling liquid passing therethrough, said second conduit being connected to said trough.

References Cited in the file of this patent
UNITED STATES PATENTS

| | | |
|---|---|---|
| 1,036,484 | Glass et al. | Aug. 20, 1912 |
| 1,913,273 | Hammers et al. | June 6, 1933 |
| 2,435,798 | Rice et al. | Feb. 10, 1948 |
| 2,481,135 | Maness, Jr. et al. | Sept. 6, 1949 |